(12) United States Patent
Kim

(10) Patent No.: US 9,014,752 B2
(45) Date of Patent: Apr. 21, 2015

(54) FRONT END DEVICE

(71) Applicant: Murata Manufacturing Co., Ltd., Nagaokakyo-shi, Kyoto-fu (JP)

(72) Inventor: Ryangsu Kim, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 21 days.

(21) Appl. No.: 14/013,312

(22) Filed: Aug. 29, 2013

(65) Prior Publication Data

US 2014/0128010 A1    May 8, 2014

(30) Foreign Application Priority Data

Nov. 7, 2012 (JP) ................................ 2012-245437

(51) Int. Cl.
| | |
|---|---|
| H04M 1/00 | (2006.01) |
| H04B 1/18 | (2006.01) |
| H04B 1/04 | (2006.01) |
| G06F 13/20 | (2006.01) |
| G06F 13/40 | (2006.01) |
| H04B 1/00 | (2006.01) |
| H04L 12/40 | (2006.01) |

(52) U.S. Cl.
CPC *H04B 1/18* (2013.01); *H04B 1/406* (2013.01); *G06F 13/20* (2013.01); *G06F 13/4022* (2013.01); *H04B 1/005* (2013.01); *H04L 12/40* (2013.01); *H04B 1/0458* (2013.01)

(58) Field of Classification Search
CPC ........ H04B 1/005; H04B 1/406; H04L 12/40; H04L 12/4032; H04L 29/10; G06D 13/20; G06D 13/40; G06D 13/4022

USPC ............................................ 455/552.1, 553.1
See application file for complete search history.

(56) References Cited

U.S. PATENT DOCUMENTS

| | | | | |
|---|---|---|---|---|
| 5,159,707 | A * | 10/1992 | Mogi et al. | 455/134 |
| 5,715,525 | A * | 2/1998 | Tarusawa et al. | 455/101 |
| 5,867,535 | A * | 2/1999 | Phillips et al. | 375/295 |
| 6,708,044 | B1 * | 3/2004 | Puknat et al. | 455/552.1 |
| 7,149,473 | B1 * | 12/2006 | Lindlar et al. | 455/41.1 |
| 7,158,574 | B2 * | 1/2007 | Vishakhadatta et al. | 375/259 |
| 7,805,553 | B2 * | 9/2010 | Kasahara et al. | 710/62 |
| 2002/0142741 | A1 * | 10/2002 | Molnar et al. | 455/127 |
| 2004/0048572 | A1 * | 3/2004 | Godfrey | 455/41.2 |
| 2005/0192048 | A1 * | 9/2005 | Bridgelall | 455/553.1 |

(Continued)

FOREIGN PATENT DOCUMENTS

| | | |
|---|---|---|
| JP | 2001-326579 A | 11/2001 |
| JP | 2009-141561 A | 6/2009 |

(Continued)

*Primary Examiner* — Duc M Nguyen
(74) *Attorney, Agent, or Firm* — Keating & Bennett, LLP

(57) ABSTRACT

A front end device includes an upper-level device and a lower-level device. The upper-level device includes an S/P interface unit. The lower-level device includes a parallel interface unit and a high-frequency processor. The S/P interface unit is connected to an RFIC and the parallel interface unit, receives a serial signal from the RFIC, converts the serial signal into a parallel signal, and transmits the parallel signal to the parallel interface unit. The parallel interface unit receives the parallel signal and supplies the parallel signal to the high-frequency processor. The high-frequency processor is connected between the RFIC and an antenna and performs certain processing on a high-frequency signal based on the parallel signal.

14 Claims, 3 Drawing Sheets

(56) References Cited

U.S. PATENT DOCUMENTS

2006/0030265 A1* 2/2006 Desai et al. .................. 455/41.2
2011/0280147 A1 11/2011 Tikka et al.
2012/0233374 A1* 9/2012 Whitefield et al. ........... 710/313

FOREIGN PATENT DOCUMENTS

| JP | 2012-501614 A | 1/2012 |
|---|---|---|
| WO | 2010/066526 A1 | 6/2010 |

* cited by examiner

FRONT END DEVICE

BACKGROUND OF THE INVENTION

1. Field of the Invention

The present invention relates to a front end device that is connected between a transmission-reception apparatus and an antenna and that performs certain processing on a high-frequency signal.

2. Description of the Related Art

Mobile communication terminals, such as cellular phone terminals, supporting multiple communication methods and frequency bands are in widespread use in recent years. Many semiconductor components including switch integrated circuits (ICs) and power amplifier ICs are mounted on front end devices used in such mobile communication terminals. In order to support the multiple communication methods and frequency bands, the number of semiconductor components mounted in each front end device tends to increase. Such front end devices include, for example, a front end device disclosed in Japanese Unexamined Patent Application Publication No. 2012-501614. The front end device described in Japanese Unexamined Patent Application Publication No. 2012-501614 includes multiple switch ICs and power amplifiers in order to support the multiple communication methods and frequency bands.

The semiconductor components used in the mobile communication terminals, such as the cellular phone terminals, have hitherto been controlled by a parallel transmission method typified by General Purpose Input/Output (GPIO). However, the semiconductor components used in the mobile communication terminals tends to be controlled by a serial transmission method typified by Mobile Industry Processor Interface (MIPI) in order to meet a request to reduce the number of wires, a request to reduce power consumption, and so on. A system using the serial transmission method is disclosed in, for example, Japanese Unexamined Patent Application Publication No. 2009-141561. In a mobile communication terminal described in Japanese Unexamined Patent Application Publication No. 2009-141561, control signals for a semiconductor device are subjected to serial transmission by a differential transmission method.

FIG. 3 illustrates an example of a front end device in related art using the serial transmission method. FIG. 3 is a circuit diagram illustrating a front end device 1P in the related art. Referring to FIG. 3, the front end device 1P includes five high-frequency devices 11P. Each high-frequency device 11P includes a serial-parallel interface unit (S/P I/F) 11aP and a high-frequency processor 11bP. An identifier (ID) (an identification specific number) is allocated to each of the five high-frequency devices 11P. The high-frequency device 11P is, for example, a semiconductor component, such as a switch IC or a power amplifier IC.

The S/P interface unit 11aP is connected to a serial interface unit (S I/F) 31a in a Radio Frequency Integrated Circuit (RFIC) 31 via three signal lines. The high-frequency processor 11bP is connected between the RFIC 31 and an antenna (not illustrated). The RFIC 31 receives and outputs a high-frequency signal that is received with and transmitted from the antenna and outputs a serial signal from the serial interface unit 31a to control the front end device 1P.

The S/P interface unit 11aP receives the serial signal from the serial interface unit 31a to compare ID information included in the serial signal with the specific ID. If the ID information included in the serial signal coincides with the specific ID, the S/P interface unit 11aP converts the serial signal into a parallel signal to control the high-frequency processor 11bP on the basis of the parallel signal. The high-frequency processor 11bP performs certain processing on the high-frequency signal supplied from the RFIC 31 side or the antenna side under the control of the S/P interface unit 11aP.

As illustrated in FIG. 3, it is necessary for the high-frequency device supporting the serial transmission method to include the S/P interface unit that performs the serial-to-parallel conversion. The S/P interface unit generally requires a large mounting area. Accordingly, the size of each high-frequency device that is mounted is increased in the front end device using the serial transmission method for the control of the high-frequency devices. As a result, the front end device including the multiple high-frequency devices is increased in size. In other words, since it is necessary to mount the multiple large high-frequency devices when the serial transmission method is used for the control of the high-frequency devices, the front end device is increased in size.

SUMMARY OF THE INVENTION

Accordingly, preferred embodiments of the present invention provide a front end device that is reduced in size while keeping its processing function.

According to a preferred embodiment of the present invention, a front end device is connected between a transmission-reception apparatus and an antenna and performs certain processing on a high-frequency signal. The front end device includes a first high-frequency device and a second high-frequency device. The first high-frequency device includes a first interface unit. The second high-frequency device includes a second interface unit and a second high-frequency device processor. The first interface unit is connected to the transmission-reception apparatus and the second interface unit, receives a serial signal from the transmission-reception apparatus, converts the serial signal into a parallel signal, and transmits the parallel signal to the second interface unit. The second interface unit receives the parallel signal and supplies the parallel signal to the second high-frequency device processor. The second high-frequency device processor is connected between the transmission-reception apparatus and the antenna and performs certain processing on the high-frequency signal on the basis of the parallel signal.

In the above configuration, only the first high-frequency device includes the first interface unit having the serial-to-parallel conversion function. Accordingly, the first high-frequency device is larger than the second high-frequency device. In other words, only the first high-frequency device is increased in size and the second high-frequency device avoids the increase in size. Consequently, compared with the case in which the first interface units are mounted in all the high-frequency devices controlled by the transmission-reception apparatus, the number of the high-frequency devices the sizes of which are increased is reduced. In addition, multiple second high-frequency devices may be provided in the front end device, if required. As a result, the front end device that is reduced in size is achieved while keeping its processing function.

The front end device is preferably configured in the following manner. The first high-frequency device includes a first high-frequency device processor. The first high-frequency device processor is connected between the transmission-reception apparatus and the antenna and performs certain processing on the high-frequency signal under the control of the first interface unit based on the serial signal.

With the above configuration, the first high-frequency device is also capable of processing the high-frequency signal. Accordingly, compared with the case in which the first high-frequency device includes only the first interface unit, the number of the second high-frequency devices is decreased. Consequently, the front end device that is further reduced in size is achieved while keeping its processing function.

According to various preferred embodiments of the present invention, since the number of the high-frequency devices that perform the serial-to-parallel conversion is decreased, it is possible to realize the front end device that is reduced in size while keeping its processing function.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
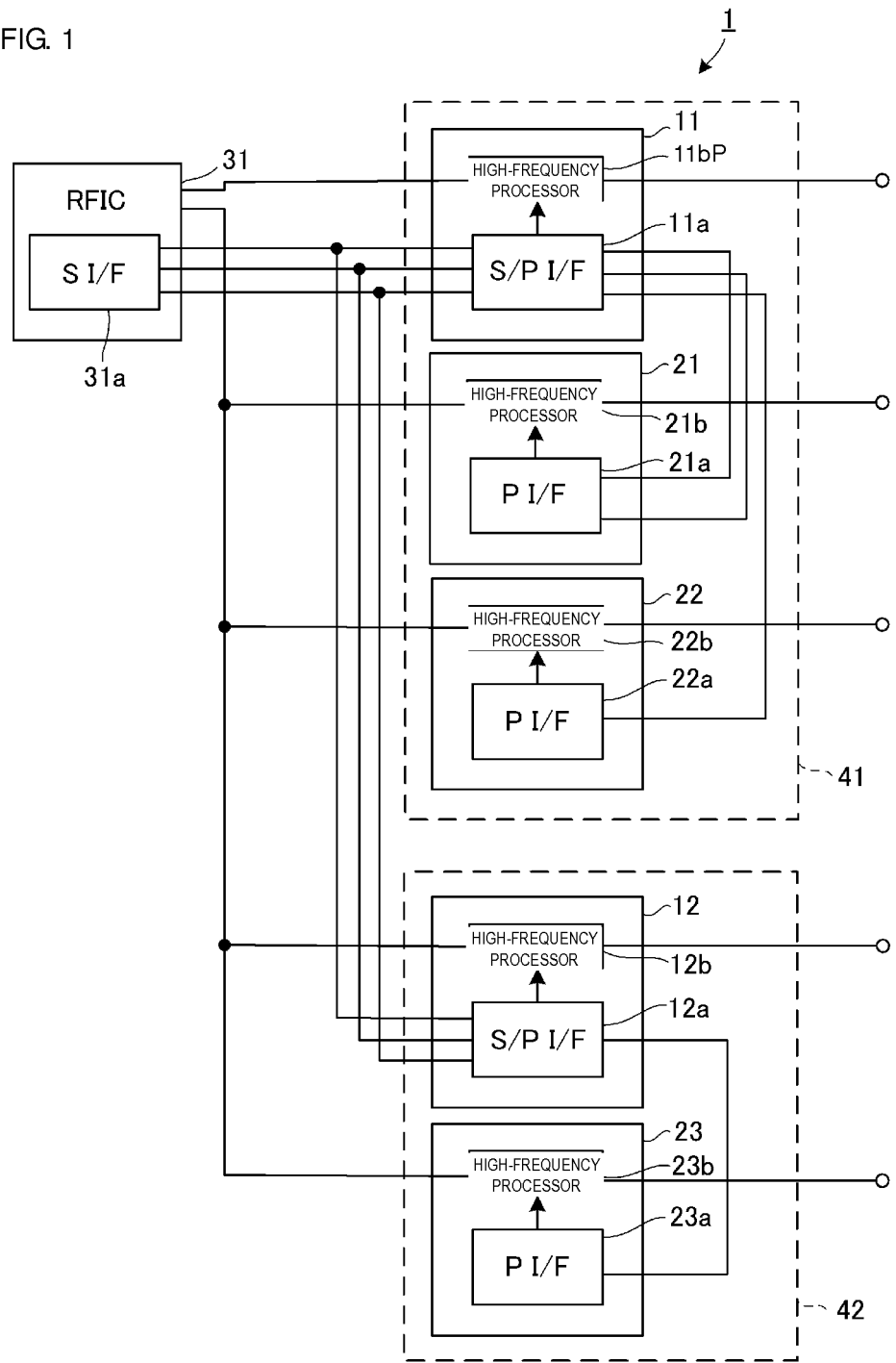
FIG. 1 is a circuit diagram illustrating a front end device according to a first preferred embodiment of the present invention.

A front end device 1 according to a first preferred embodiment of the present invention will now be described. FIG. 1 is a circuit diagram illustrating the front end device 1. Referring to FIG. 1, the front end device 1 includes upper-level devices 11 and 12 and lower-level devices 21, 22, and 23. The upper-level devices 11 and 12 each correspond to a first high-frequency device. The lower-level devices 21, 22, and 23 each correspond to a second high-frequency device.

The upper-level device 11 includes an S/P interface unit (S/P I/F) 11a and a high-frequency processor 11b. The upper-level device 12 includes an S/P interface unit (S/P I/F) 12a and a high-frequency processor 12b. The lower-level device 21 includes a parallel interface unit (P I/F) 21a and a high-frequency processor 21b. The lower-level device 22 includes a parallel interface unit (P I/F) 22a and a high-frequency processor 22b. The lower-level device 23 includes a parallel interface unit (P I/F) 23a and a high-frequency processor 23b. The S/P interface units 11a and 12a each correspond to a first interface unit. The parallel interface units 21a, 22a, and 23a each correspond to a second interface unit. Each of the high-frequency processors 11b, 12b, 21b, 22b, and 23b is, for example, a switch circuit, a low noise amplifier circuit, or a power amplifier. The function allocated to each high-frequency processor is determined by the mounting area, the arrangement of the high-frequency devices, the cost, and so on.

The S/P interface units 11a and 12a are each connected to a serial interface unit (S I/F) 31a in an RFIC 31 via three signal lines. The three signal lines are used for a data signal, a clock signal, and power. The RFIC 31 corresponds to a transmission-reception apparatus. The S/P interface unit 11a is connected to the parallel interface unit 21a via two signal lines and is connected to the parallel interface unit 22a via one signal line. The S/P interface unit 12a is connected to the parallel interface unit 23a via one signal line.

The configuration of the signal lines between the serial interface unit and the S/P interface units is not limited to the configuration described above as long as the serial transmission method is adopted. The numbers of the signal lines between the S/P interface units and the parallel interface units are also not limited to the numbers described above and depend on the function of the high-frequency processors controlled by the parallel interface units.

The upper-level device 11 and the lower-level devices 21 and 22 define a high-frequency device group 41. The upper-level device 12 and the lower-level device 23 define a high-frequency device group 42. The high-frequency device groups 41 and 42 each correspond to a "pair of the first high-frequency device and the second high-frequency device." An identifier (ID) is allocated to each of the high-frequency device groups 41 and 42.

The high-frequency processors 11b, 12b, 21b, 22b, and 23b are connected between the RFIC 31 and an antenna (not illustrated). The high-frequency processors 11b and 12b each correspond to a first high-frequency device processor. The high-frequency processors 21b, 22b, and 23b each correspond to a second high-frequency device processor.

The RFIC 31 receives and outputs a high-frequency signal that is received with and transmitted from the antenna and outputs a serial signal from the serial interface unit 31a to control the front end device 1. Specifically, the RFIC 31 outputs a control signal so that the high-frequency processors in the upper-level devices 11 and 12 and the lower-level devices 21, 22, and 23 perform desired signal processing.

In the mounting of the front end device 1, for example, each of the upper-level devices and the lower-level devices is included in one IC package and each IC package is arranged on a substrate. Each high-frequency device group may be included in one IC package. The front end device 1 may be included in one IC package. Other circuit elements including a matching circuit and a filter may be arranged between the RFIC 31 and the front end device 1 and between the front end device 1 and the antenna.

The S/P interface unit 11a receives a serial signal S1 from the serial interface unit 31a. The S/P interface unit 11a compares ID information included in the serial signal S1 with the ID allocated to the specific high-frequency device group. If the ID information included in the serial signal S1 coincides with the ID allocated to the specific high-frequency device group, the S/P interface unit 11a converts the serial signal S1 into a parallel signal P1 and transmits the parallel signal P1 to the parallel interface units 21a and 22a. The S/P interface unit 11a supplies the parallel signal P1 to the high-frequency processor 11b. If the ID information included in the serial signal S1 does not coincide with the ID allocated to the high-frequency device group, the S/P interface unit 11a does not perform the signal processing and enter a waiting state again. The S/P interface unit 12a performs the same processing on the parallel interface unit 23a and the high-frequency processor 12b.

The parallel interface unit 21a receives the parallel signal P1 from the S/P interface unit 11a and supplies the parallel signal P1 to the high-frequency processor 21b. The parallel interface unit 22a performs the same processing on the high-frequency processor 22b and the parallel interface unit 23a performs the same processing on the high-frequency processor 23b.

The high-frequency processor 11b performs certain processing on the high-frequency signal input with or output from the RFIC 31 or the antenna on the basis of the parallel signal P1. The high-frequency processors 12b, 21b, 22b, and 23b perform the same processing.

In general, the S/P interface unit requires a large mounting area. Accordingly, the high-frequency device including the S/P interface unit is increased in size. According to the first preferred embodiment, the upper-level devices 11 and 12 receiving the serial signal each include the S/P interface unit while the lower-level devices 21, 22, and 23 receiving the parallel signal does not require the S/P interface unit. Accordingly, only the upper-level devices 11 and 12 are increased in size and the lower-level devices avoid the increase in size. Consequently, compared with the case in which the S/P interface units are mounted in all the high-frequency devices controlled by the RFIC, the number of the high-frequency devices the sizes of which are increased is reduced. In addition, multiple second high-frequency devices may be provided in the front end device, if required.

As a result, the front end device 1 that is reduced in size is achieved while keeping its processing function.

In addition, the number of external connection terminals is increased by three in the upper-level device 11, the number of the external connection terminals is decreased by one in the lower-level device 21, and the number of the external connection terminals is decreased by two in the lower-level device 22, compared with the high-frequency device 11P in the front end device 1P. The number of the external connection terminals is increased by one in the upper-level device 12 and the number of the external connection terminals is decreased by two in the lower-level device 23. Accordingly, it is possible to decrease the number of the external connection terminals by one in the front end device 1, compared with the front end device 1P in the related art.

Furthermore, since the ID is provided to each of the high-frequency device groups 41 and 42, it is possible for the RFIC 31 to control the front end device 1 with the IDs of a smaller number than that in the front end device 1P in the related art.

Furthermore, it is possible to decrease the number of wires between the RFIC 31 and the front end device 1, compared with the case in the front end device 1P in the related art.

Furthermore, since the output load impedance of the RFIC 31 is reduced, the size of an output buffer of the RFIC 31 is reduced. Accordingly, it is possible to reduce the power consumption in the RFIC 31 and to decrease the mounting area of the RFIC 31.

Although the RFIC is described as an example of the transmission-reception apparatus in the first preferred embodiment, the transmission-reception apparatus may be exemplified by a semiconductor element, such as a baseband integrated circuit (BBIC).

Figure 2:
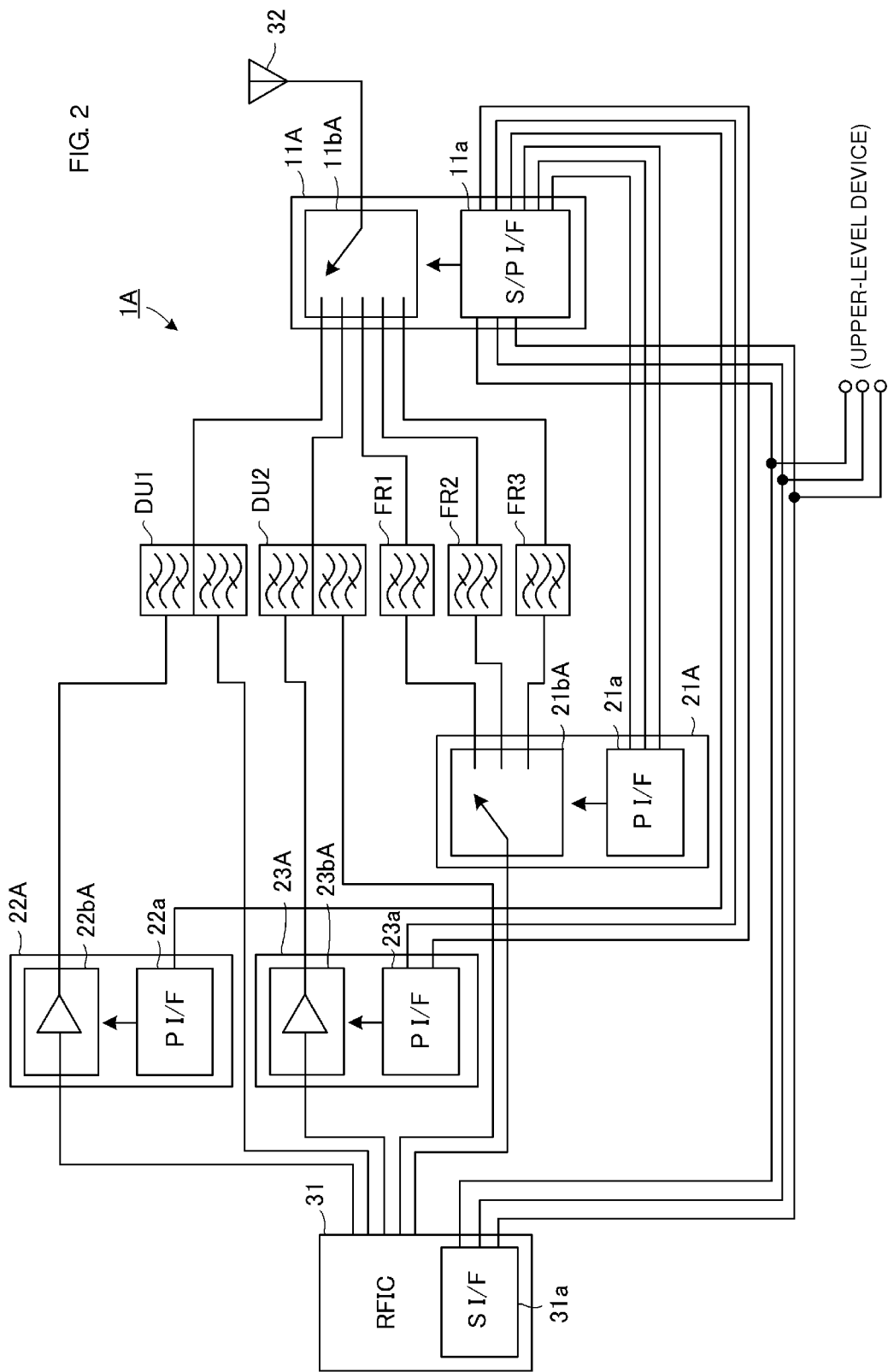
FIG. 2 is a circuit diagram illustrating a portion of a front end device according to a second preferred embodiment of the present invention.
Figure 3:
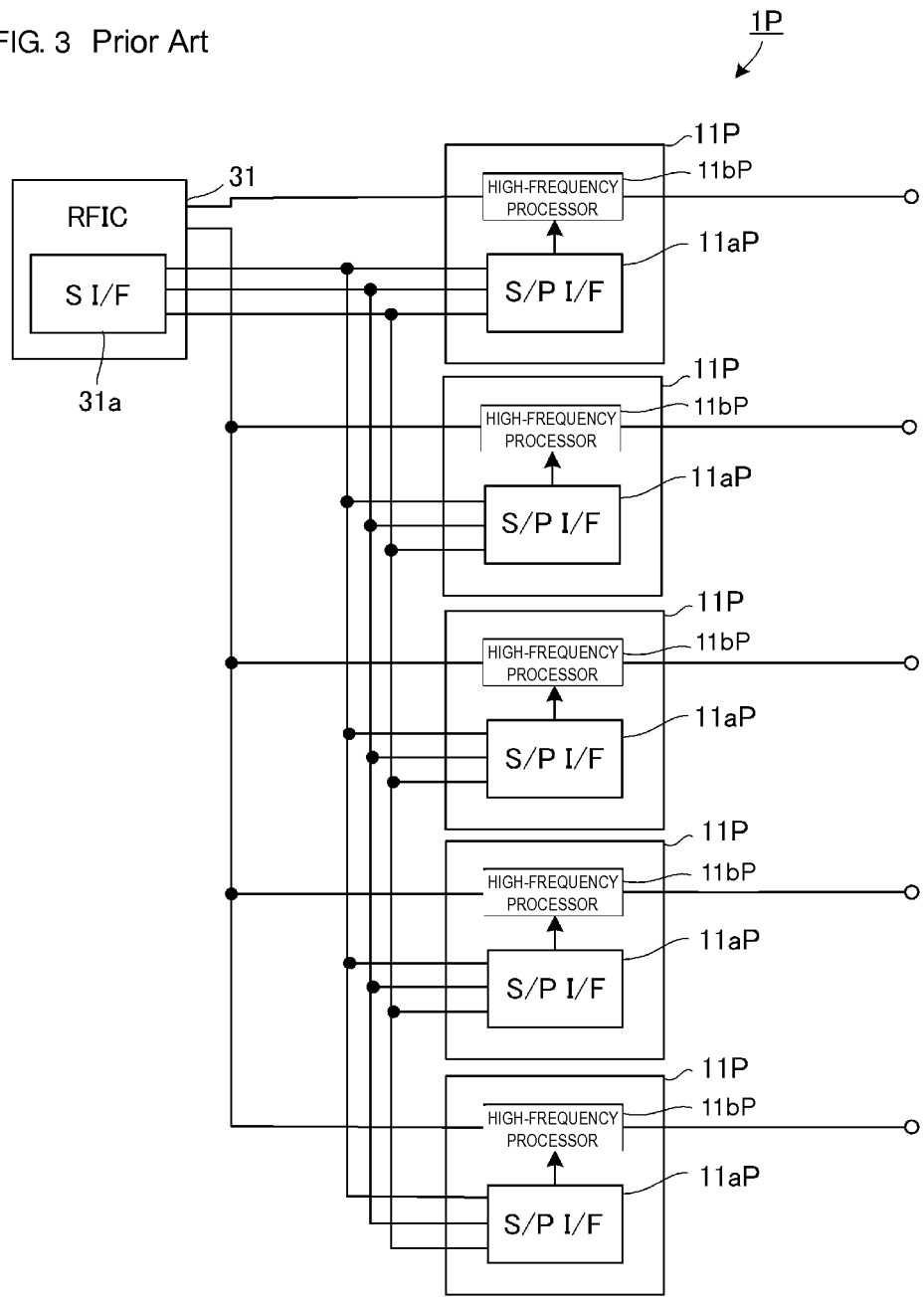
FIG. 3 is a circuit diagram illustrating a front end device in the related art.

A front end device 1A according to a second preferred embodiment of the present invention will now be described. FIG. 2 is a circuit diagram illustrating a portion of the front end device 1A. Referring to FIG. 2, the front end device 1A includes an upper-level device 11A and lower-level devices 21A, 22A, and 23A. The front end device 1A also includes other upper-level devices and lower-level devices that are not illustrated.

The upper-level device 11A includes an S/P interface unit (S/P I/F) 11a and a switch circuit 11bA. The switch circuit 11bA corresponds to the first high-frequency device processor. The lower-level device 21A includes a parallel interface unit (P I/F) 21a and a switch circuit 21bA. The lower-level device 22A includes a parallel interface unit (P I/F) 22a and a power amplifier 22bA. The lower-level device 23A includes a parallel interface unit (P I/F) 23a and a power amplifier 23bA. The power amplifiers 22bA and 23bA each correspond to an amplifier circuit and the second high-frequency device processor. The switch circuit 11bA includes a switch common terminal and first to fifth switching terminals. The switch circuit 21bA includes a switch common terminal and first to third switching terminals.

The S/P interface unit 11a is connected to the serial interface unit (S I/F) 31a in the RFIC 31 via three signal lines. The S/P interface unit 11a is connected to the parallel interface unit 21a via three signal lines, is connected to the parallel interface unit 22a via one signal line, and is connected to the parallel interface unit 23a via two signal lines.

The switch common terminal of the switch circuit 11bA is connected to an antenna 32. The first switching terminal of the switch circuit 11bA is connected to a duplexer DU1. The second switching terminal of the switch circuit 11bA is connected to a duplexer DU2. The third switching terminal of the switch circuit 11bA is connected to the first switching terminal of the switch circuit 21bA via a transmission filter FR1. The fourth switching terminal of the switch circuit 11bA is connected to the second switching terminal of the switch circuit 21bA via a transmission filter FR2. The fifth switching terminal of the switch circuit 11bA is connected to the third switching terminal of the switch circuit 21bA via a transmission filter FR3.

A transmission side filter of the duplexer DU1 is connected to the RFIC 31 via the power amplifier 22bA. A transmission side filter of the duplexer DU2 is connected to the RFIC 31 via the power amplifier 23bA. A reception side filter of each of the duplexers DU1 and DU2 is connected to the RFIC 31. The switch common terminal of the switch circuit 21bA is connected to the RFIC 31.

For example, when a high-frequency signal path passing through the duplexer DU1 is selected, the front end device 1A operates in the following manner.

The serial interface unit 31a in the RFIC 31 transmits a serial signal S2 to control the switch circuit 11bA to the S/P interface unit 11a in the upper-level device 11A. The S/P interface unit 11a receives the serial signal S2 to compare ID information included in the serial signal S2 with the ID allocated to the specific high-frequency device group. After the S/P interface unit 11a confirms that the ID information included in the serial signal S2 coincides with the ID allocated to the specific high-frequency device group, the S/P interface unit 11a converts the serial signal S2 into a parallel signal P2. The S/P interface unit 11a supplies the parallel signal P2 to the switch circuit 11bA. The switch circuit 11bA connects the switch common terminal to the first switching terminal on the basis of the parallel signal P2. The high-frequency signal path passing through the duplexer DU1 is selected in the above manner.

The serial interface unit 31a transmits a serial signal S3 to control the power amplifier 22bA to the S/P interface unit 11a. The S/P interface unit 11a receives the serial signal S3 to compare ID information included in the serial signal S3 with the ID allocated to the specific high-frequency device group. After the S/P interface unit 11a confirms that the ID information included in the serial signal S3 coincides with the ID allocated to the specific high-frequency device group, the S/P interface unit 11a converts the serial signal S3 into a parallel signal P3 and transmits the parallel signal P3 to the parallel interface unit 22a. The parallel interface unit 22a receives the parallel signal P3 and supplies the parallel signal P2 to the power amplifier 22bA. The power amplifier 22bA amplifies a high-frequency signal supplied from the RFIC 31 on the basis of the parallel signal P3.

The high-frequency signal supplied from the RFIC 31 is amplified to a certain amplitude by the power amplifier 22bA, passes through the transmission side filter of the duplexer DU1 and the switch circuit 11bA, and is transmitted from the antenna 32.

When a high-frequency signal path passing through the transmission filter FR1 is selected, the front end device 1A operates in the following manner.

The serial interface unit 31a in the RFIC 31 transmits a serial signal S4 to control the switch circuits 11bA and 21bA to the S/P interface unit 11a in the upper-level device 11A. The S/P interface unit 11a receives the serial signal S4 to compare ID information included in the serial signal S4 with the ID allocated to the specific high-frequency device group. After the S/P interface unit 11a confirms that the ID information included in the serial signal S4 coincides with the ID allocated to its specific high-frequency device group, the S/P interface unit 11a converts the serial signal S4 into a parallel signal P4 and transmits the parallel signal P4 to the parallel interface unit 21a. The S/P interface unit 11a supplies the parallel signal P4 to the switch circuit 11bA. The switch circuit 11bA connects the switch common terminal of the switch circuit 11bA to the third switching terminal on the basis of the parallel signal P4. The parallel interface unit 21a receives the parallel signal P4 and supplies the parallel signal P4 to the switch circuit 21bA. The switch circuit 21bA connects the switch common terminal of the switch circuit 21bA to the first switching terminal on the basis of the parallel signal P4. The high-frequency signal path passing through the transmission filter FR1 is selected in the above manner.

The high-frequency signal supplied from the RFIC 31 passes through the switch circuit 21bA, the transmission filter FR1, and the switch circuit 11bA and is transmitted from the antenna 32.

According to the second preferred embodiment, the front end device 1A that is reduced in size is achieved while keeping its processing function, as in the first preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A front end device that is connected between a transmission-reception apparatus and an antenna and that performs certain processing on a high-frequency signal, the front end device comprising:
    a first high-frequency device including a first interface unit; and
    a second high-frequency device including a second interface unit and a second high-frequency device processor; wherein
    the first interface unit is connected to the transmission-reception apparatus and the second interface unit, receives only a serial signal and no parallel signal from the transmission-reception apparatus, converts the serial signal into a parallel signal, and transmits the parallel signal to the second interface unit;
    the second interface unit receives the parallel signal only from the first interface unit and supplies the parallel signal to the second high-frequency device processor; and
    the second high-frequency device processor is connected between the transmission-reception apparatus and the antenna and performs processing on the high-frequency signal based on the parallel signal.

2. The front end device according to claim 1, wherein the first high-frequency device includes a first high-frequency device processor; and
    the first high-frequency device processor is connected between the transmission-reception apparatus and the antenna and performs processing on the high-frequency signal under control of the first interface unit based on the serial signal.

3. The front end device according to claim 2, wherein the first high-frequency device processor and the second high-frequency device processor is one of a switch circuit, a low noise amplifier circuit, or a power amplifier.

4. The front end device according to claim 2, wherein the first high-frequency processor is connected between an RFIC and an antenna.

5. The front end device according to claim 2, wherein the first interface unit is connected to a serial interface unit via three signal lines.

6. The front end device according to claim 2, wherein the first interface unit is connected to a first parallel interface unit via three signal lines, is connected to a second parallel interface unit via one signal line, and is connected to a third parallel interface unit via two signal lines.

7. The front end device according to claim 1, wherein the front end device includes a plurality of second high-frequency devices.

8. The front end device according to claim 1, wherein the front end device includes a plurality of pairs of the first high-frequency device and the second high-frequency device.

9. The front end device according to claim 8, wherein each pair of the first high-frequency device and the second high-frequency device includes one IC package.

10. The front end device according to claim 1, wherein the first or second high-frequency device processor is a switch circuit that switches a high-frequency signal path connecting the transmission-reception apparatus to the antenna.

11. The front end device according to claim 1, wherein the first or second high-frequency device processor is an amplifier circuit that amplifies the high-frequency signal transmitted from or received with the antenna based on the parallel signal.

12. The front end device according to claim 1, wherein the first interface unit is connected to a serial interface unit in an via three signal lines for a data signal, a clock signal, and power.

13. The front end device according to claim 1, wherein the first interface unit is connected to a first parallel interface unit via two signal lines and is connected to a second parallel interface unit.

14. The front end device according to claim 1, wherein the transmission-reception apparatus is one of an RFIC, a semiconductor element, and a baseband integrated circuit.

* * * * *